United States Patent
Helbert et al.

(10) Patent No.: US 9,900,433 B1
(45) Date of Patent: Feb. 20, 2018

(54) SYSTEM FOR AND METHOD OF ESTABLISHING AN AUGMENTED COMMUNICATION CHANNEL WITH AN INTERACTIVE VOICE RESPONSE SYSTEM

(71) Applicant: ALE INTERNATIONAL, Colombes (FR)

(72) Inventors: Emmanuel Helbert, Andlau (FR); Philippe Gerner, Strasbourg (FR); Raymond Roth, Truchtersheim (FR)

(73) Assignee: ALE INTERNATIONAL, Colombes (FR)

( * ) Notice: Subject to any disclaimer, the term of this patent is extended or adjusted under 35 U.S.C. 154(b) by 0 days.

(21) Appl. No.: 15/448,993

(22) Filed: Mar. 3, 2017

(51) Int. Cl.
| | | |
|---|---|---|
| *H04M 3/493* | (2006.01) | |
| *H04M 3/51* | (2006.01) | |
| *H04W 4/14* | (2009.01) | |
| *H04L 29/06* | (2006.01) | |
| *H04M 1/725* | (2006.01) | |

(52) U.S. Cl.
CPC ...... *H04M 3/5166* (2013.01); *H04L 65/1069* (2013.01); *H04M 3/493* (2013.01); *H04W 4/14* (2013.01); *H04M 1/72583* (2013.01); *H04M 2203/255* (2013.01); *H04M 2203/355* (2013.01)

(58) Field of Classification Search
CPC . H04M 3/493; H04M 3/5166; H04M 1/72583
See application file for complete search history.

(56) References Cited

U.S. PATENT DOCUMENTS

| | | | | |
|---|---|---|---|---|
| 2008/0095330 A1* | 4/2008 | Jin | ......... | H04M 3/493 379/88.13 |
| 2012/0008755 A1* | 1/2012 | Mittal | ......... | H04M 3/4931 379/93.01 |
| 2014/0064463 A1* | 3/2014 | Reddy | ......... | H04M 3/493 379/88.01 |

OTHER PUBLICATIONS

Dialogic, "Dialogic PowerVille VIVR—Visual Interactive Voice Response (VIVR)", https://www.dialogic.com/en/products/powerville/vivr.aspx retrieved on Apr. 11, 2011.

* cited by examiner

*Primary Examiner* — Nafiz E Hoque
(74) *Attorney, Agent, or Firm* — BCF LLP (57) ABSTRACT

Methods of and systems for establishing an augmented communication channel between an interactive voice response (IVR) system and an electronic device associated with a user are disclosed. A first method comprises sending, an audio call request; establishing an audio channel; establishing a data channel between the IVR system and the electronic device; receiving, via the data channel, IVR tree data, the IVR tree data allowing association of a position of the user with respect to the menu navigation structure; sending, via one of the audio channel and the data channel, a user selection relating to the IVR tree data; and receiving, via the other one of the audio channel and the data channel, an updated position of the user with respect to the menu navigation structure based on the user selection. A method to be executed by the IVR system is also disclosed.

13 Claims, 8 Drawing Sheets

SYSTEM FOR AND METHOD OF ESTABLISHING AN AUGMENTED COMMUNICATION CHANNEL WITH AN INTERACTIVE VOICE RESPONSE SYSTEM

FIELD

The present technology relates to systems and methods of establishing an augmented communication channel. In particular, the systems and methods allow establishing an augmented communication channel between an interactive voice response system and an electronic device associated with a user.

BACKGROUND

Interactive voice response systems (also referred to as "IVR systems") are widely deployed into organizations of various sizes, ranging from small and medium enterprises (SMEs) to large organizations such as, for example, hospitals and public administrations. IVR systems enable routing incoming calls from one or more users to relevant services and/or responders based on a selection made by the users, typically further to the users having listened to a menu/list of options. In most instances, the menu of options is provided to a user as an audio message via an audio channel established between the IVR system and an electronic device from which the user initiates the call. Once the user is connected to the IVR system, she/he is prompted, by the IVR system, to select, from the menu of options, which option she/he desires. The user typically provides her/his selection by pressing on a keypad associated with the electronic device. In turn, the electronic device generates a dual-tone multi-frequency (DTMF) code (also referred to as DTMF tone) associated with the entry made by the user on the keypad. The DTMF code is sent to the IVR system which interprets the DTMF code and executes a corresponding action (e.g., routing the call to a given responder).

Even though IVR systems have improved productivity by automating, at least partially, the routing of incoming calls throughout organizations, it still presents certain deficiencies, in particular in terms of user experience. For example, but without being limitative, (1) it may take time for a user to reach an item she/he wishes to select from the menu/list (as the menu/list is typically recited, via an audio channel, one item at a time) thereby resulting in potential additional communication costs; (2) an item the user is looking for may no longer exist; and/or (3) for cases wherein the menu/list is structured as a tree having multiple nodes, navigation throughout the tree may not be intuitive and may result in the user giving up looking for the item she/he wishes to select before reaching it.

Various solutions have been investigated and/or implemented to mitigate some of the drawbacks listed in the above-paragraph. Those solutions include, for example, but without being limitative, (1) click-to-call from a web page either towards a third-party communication device or within a browser using WebRTC technology; (2) visual IVR systems such as IVR solutions from Dialogic Corporation; (3) publicly providing phone numbers that are internal to a given organization; and/or (4) vocal recognition, including vocal recognition based on machine-learning algorithms.

Improvements are however still desirable.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches.

SUMMARY

Embodiments of the present technology have been developed based on developers' appreciation of shortcomings associated with the prior art.

In particular, such shortcomings may comprise (1) a limited compatibility of recent solutions with public switched telephone network (PSTN) and/or legacy IVR systems; and/or (2) not allowing the user to rely on either an audio channel or a data channel to make a selection in a menu.

In one aspect, various implementations of the present technology provide a method of establishing an augmented communication channel between an interactive voice response (IVR) system and an electronic device associated with a user, the method comprising:
  receiving, from the electronic device, an audio call request;
  establishing an audio channel between the IVR system and the electronic device;
  establishing a data channel between the IVR system and the electronic device;
  transmitting, via the data channel, IVR tree data representative of a menu navigation structure associated with the IVR system, the IVR tree data allowing association of a position of the user with respect to the menu navigation structure;
  receiving, via one of the audio channel and the data channel, a user selection relating to the IVR tree data;
  generating an updated position of the user with respect to the menu navigation structure based on the user selection; and
  transmitting, via the other one of the audio channel and the data channel, to the electronic device associated with the user, the updated position.

In another aspect, various implementations of the present technology provide a method of establishing an augmented communication channel between an interactive voice response (IVR) system and an electronic device associated with a user, the method comprising:
  sending, by the electronic device, to the IVR system, an audio call request;
  establishing an audio channel between the IVR system and the electronic device;
  establishing a data channel between the IVR system and the electronic device;
  receiving, via the data channel, IVR tree data representative of a menu navigation structure associated with the IVR system, the IVR tree data allowing association of a position of the user with respect to the menu navigation structure;
  sending, via one of the audio channel and the data channel, a user selection relating to the IVR tree data; and
  receiving, via the other one of the audio channel and the data channel, an updated position of the user with respect to the menu navigation structure based on the user selection.

In another aspect, various implementations of the present technology provide a system for establishing an augmented communication channel between an interactive voice response (IVR) system and an electronic device associated with a user, the system comprising:
  a processor;
  a non-transitory computer-readable medium, the non-transitory computer-readable medium comprising control logic which, upon execution by the processor, causes:
    receiving, from the electronic device, an audio call request;
    establishing an audio channel between the IVR system and the electronic device;
    establishing a data channel between the IVR system and the electronic device;
    transmitting, via the data channel, IVR tree data representative of a menu navigation structure associated with the IVR system, the IVR tree data allowing association of a position of the user with respect to the menu navigation structure;
    receiving, via one of the audio channel and the data channel, a user selection relating to the IVR tree data;
    generating an updated position of the user with respect to the menu navigation structure based on the user selection; and
    transmitting, via the other one of the audio channel and the data channel, to the electronic device associated with the user, the updated position.

In another aspect, various implementations of the present technology provide a system for establishing an augmented communication channel between an interactive voice response (IVR) system and an electronic device associated with a user, the system comprising:
  a processor;
  a non-transitory computer-readable medium, the non-transitory computer-readable medium comprising control logic which, upon execution by the processor, causes:
    sending, by the electronic device, to the IVR system, an audio call request;
    establishing an audio channel between the IVR system and the electronic device;
    establishing a data channel between the IVR system and the electronic device;
    receiving, via the data channel, IVR tree data representative of a menu navigation structure associated with the IVR system, the IVR tree data allowing association of a position of the user with respect to the menu navigation structure;
    sending, via one of the audio channel and the data channel, a user selection relating to the IVR tree data; and
    receiving, via the other one of the audio channel and the data channel, an updated position of the user with respect to the menu navigation structure based on the user selection.

In other aspects, various implementations of the present technology provide a non-transitory computer-readable medium storing program instructions for establishing an augmented communication channel between an interactive voice response (IVR) system and electronic device associated with a user, the program instructions being executable by a processor of a computer-based system to carry out one or more of the above-recited methods.

In other aspects, various implementations of the present technology provide a computer-based system, such as, for example, but without being limitative, an IVR system and/or an electronic device comprising at least one processor and a memory storing program instructions for establishing an augmented communication channel between an IVR system and an electronic device associated with a user, the program instructions being executable by the at least one processor of the electronic device to carry out one or more of the above-recited methods.

In the context of the present specification, unless expressly provided otherwise, a computer system may refer, but is not limited to, an "electronic device", an "interactive voice response (IVR) system", an "automatic attendant (AA) system", a "short message service (SMS) gateway", a "network device", a "telecommunication product", a "PBX", a "network system", an "operation system", a "system", a "computer-based system" and/or any combination thereof appropriate to the relevant task at hand.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives. Still in the context of the present specification, "a" computer-readable medium and "the" computer-readable medium should not be construed as being the same computer-readable medium. To the contrary, and whenever appropriate, "a" computer-readable medium and "the" computer-readable medium may also be construed as a first computer-readable medium and a second computer-readable medium.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

It should also be noted that, unless otherwise explicitly specified herein, the drawings are not to scale.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labeled as a "processor", an "application", an "IVR application", an "interactive voice response (ISR)", an "automatic attendant (AA)", an "application programming interface (API)", a "short message service (SMS) gateway", a "native telephonic application", a "telecommunication product (also referred to as PBX)" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a digital signal processor (DSP). Moreover, explicit use of the term a "processor", an "application", an "IVR application", an "interactive voice response (ISR)", an "automatic attendant (AA)", an "application programming interface (API)", a "short message service (SMS) gateway", a "native telephonic application", a "telecommunication product (also referred to as PBX)" should not be construed to refer exclusively to hardware capable of executing software, and may implicitly include, without limitation, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown. Moreover, it should be understood that module may include for example, but without being limitative, computer program logic, computer program instructions, software, stack, firmware, hardware circuitry or a combination thereof which provides the required capabilities.

With these fundamentals in place, we will now consider some non-limiting examples to illustrate various implementations of aspects of the present technology.

Figure 1:
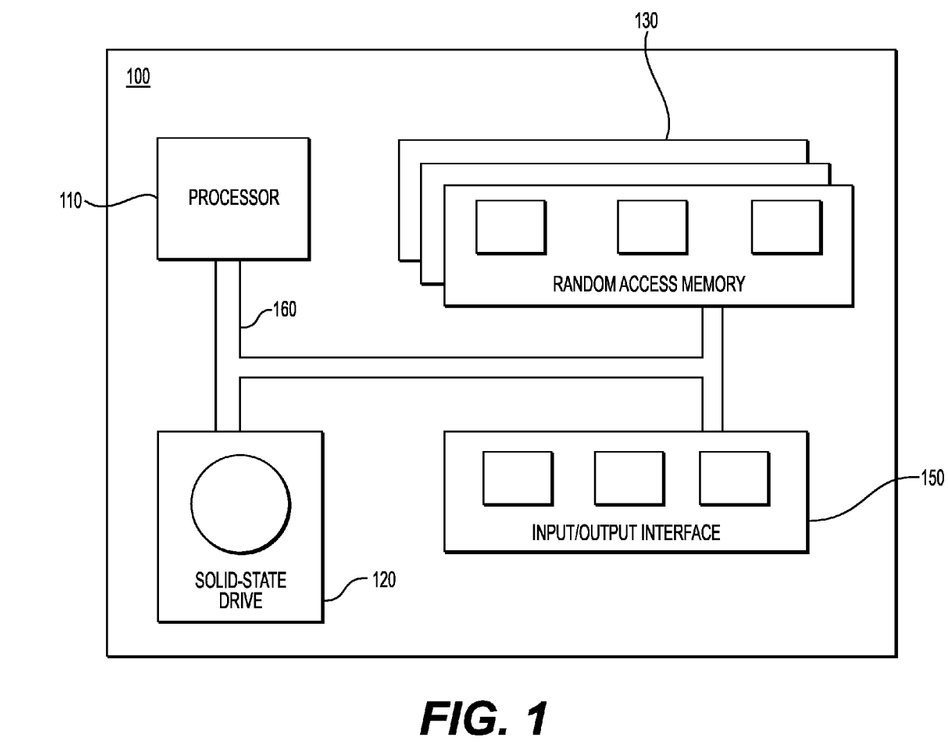
FIG. 1 is a diagram of a computing environment in accordance with an embodiment of the present technology.

FIG. 1 illustrates a diagram of a computing environment 100 in accordance with an embodiment of the present technology is shown. In some embodiments, the computing environment 100 may be implemented by any of the "electronic device", the "interactive voice response (IVR) system", the "automatic attendant (AA) system", the "short message service (SMS) gateway" and/or the "PBX" illustrated in FIG. 2 to 5. In some embodiments, the computing environment 100 comprises various hardware components including one or more single or multi-core processors collectively represented by a processor 110, a solid-state drive 120, a random access memory 130 and an input/output interface 150. The computing environment 100 may be a computer specifically designed for communications solutions and services such as, but not limited to, telecommunications, networking and/or cloud solutions. In some alternative embodiments, the computing environment 100 may be a generic computer system. The computing environment 100 may be an "electronic device", an "interactive voice response (IVR) system", an "automatic attendant (AA) system", a "short message service (SMS) gateway", a "network device", a "telecommunication product", a "PBX", a "network system", an "operation system", a "system", a "computer-based system" and/or any combination thereof appropriate to the relevant task at hand.

In some embodiments, the computing environment 100 may also be a sub-system of one of the above-listed systems. In some other embodiments, the computing environment 100 may be an "off the shelf" generic computer system. In some embodiments, the computing environment 100 may also be distributed amongst multiple systems. The computing environment 100 may also be specifically dedicated to the implementation of the present technology. As a person in the art of the present technology may appreciate, multiple variations as to how the computing environment 100 is implemented may be envisioned without departing from the scope of the present technology.

Communication between the various components of the computing environment 100 may be enabled by one or more internal and/or external buses 160 (e.g. a PCI bus, universal serial bus, IEEE 1394 "Firewire" bus, SCSI bus, Serial-ATA bus, ARINC bus, etc.), to which the various hardware components are electronically coupled.

The input/output interface 150 may allow enabling networking capabilities such as wire or wireless access. As an example, the input/output interface 150 may comprise a networking interface such as, but not limited to, a network port, a network socket, a network interface controller and the like. Multiple examples of how the networking interface may be implemented will become apparent to the person skilled in the art of the present technology. For example, but without being limitative, the networking interface may implement specific physical layer and data link layer standard such as Ethernet, Fibre Channel, Wi-Fi or Token Ring. The specific physical layer and the data link layer may provide a base for a full network protocol stack, allowing communication among small groups of computers on the same local area network (LAN) and large-scale network communications through routable protocols, such as Internet Protocol (IP).

According to implementations of the present technology, the solid-state drive 120 stores program instructions suitable for being loaded into the random access memory 130 and executed by the processor 110 for establishing an augmented communication channel between an IVR system and an electronic device associated with a user. For example, the program instructions may be part of a library or an application.

Figure 2:
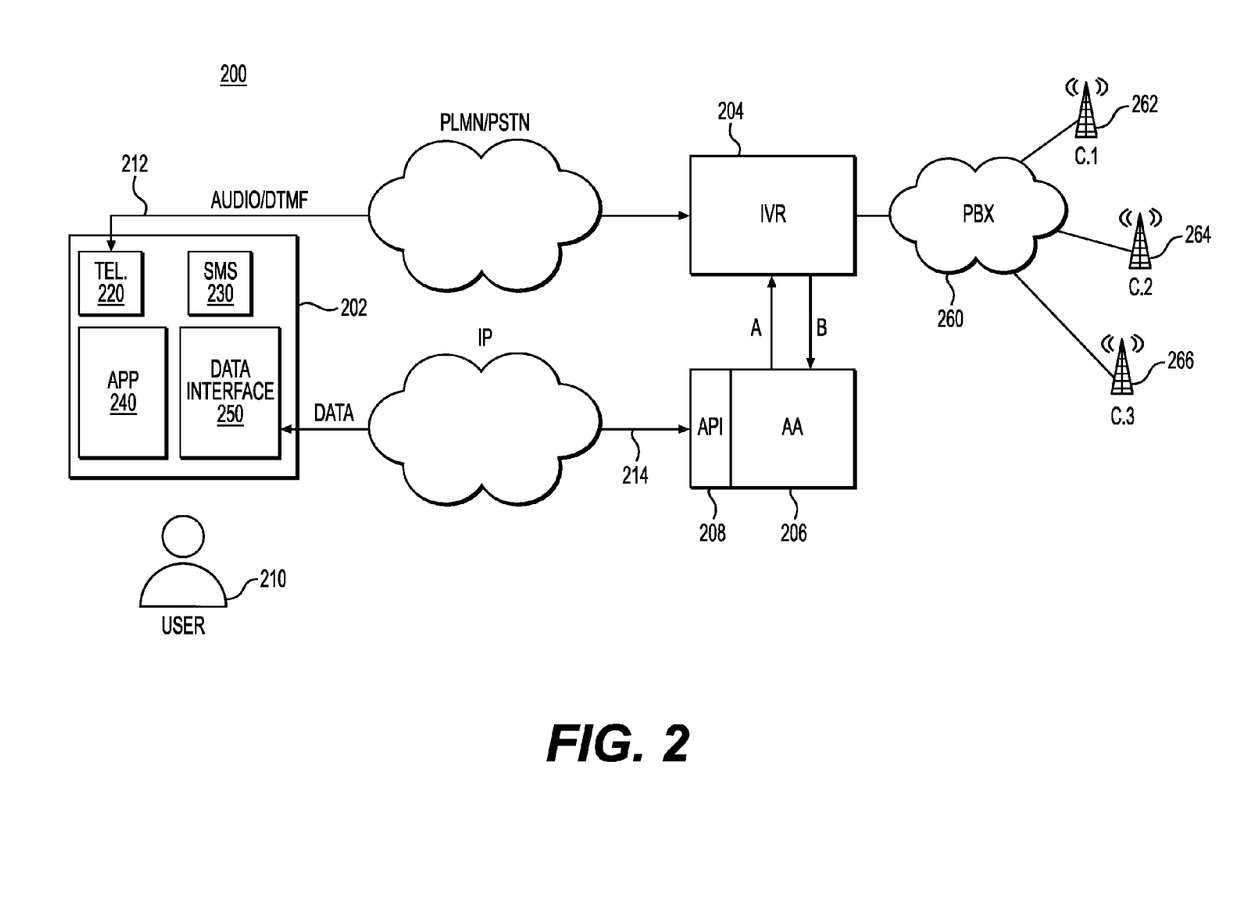
FIG. 2 is a diagram of a first networked computing environment suitable for use with some implementations of the present technology.

In FIG. 2, there is shown a networked computing environment 200 suitable for use with some implementations of the present technology. The networked computing environment 200 comprises an electronic device 202 associated with a user 210, an interactive voice response (IVR) system 204, an automatic attendant (AA) system 206 and a telecommunication product (PBX) 260.

The electronic device 202 may also be referred to as a "client device", an "electronic device" and an "electronic device associated with a user". The implementation of the electronic device 202 is not particularly limited. As an example, the electronic device 202 may be implemented as a personal computer (desktops, laptops, netbooks, etc.), a wireless communication device (a cell phone, a smartphone, a tablet and the like) or a connected object (a connected watch, a connected car, an augment reality device and the like). The electronic device 202 may comprise hardware and/or software and/or firmware (or a combination thereof), as it is known in the art, to execute a native telephonic application 220, a short message service (SMS) application 230 and an application 240 (also referred to as an "IVR application"). In some embodiments, the electronic device 202 also comprises a data interface 250 which implementation may be similar to input/output interface 150 of FIG. 1. The native telephonic application 220 may be an application allowing the electronic device 202 to conduct phone calls over conventional audio channels such as, for example, but without being limitative, over public land mobile network (PLMN) and/or public switched telephone network (PSTN). In some alternative embodiment, the native telephonic application 220 may also be able to conduct voice over IP (VoIP) phone calls.

The SMS application 230 may be an application allowing the electronic device 202 to send and receive text messages as it may become apparent to the person skilled in the art of the present technology.

Even though reference is made to a native application for the native telephonic application 220, it should be understood that both the native telephonic application 220 and the SMS application 230 does not necessary have to be built-in the electronic device 202. To the contrary, the native telephonic application 220 and the SMS application 230 may be third-party applications which may been installed on the electronic device 202 at any given time.

In some embodiments, the application 240 may be a dedicated application associated with one or more service providers and therefore associated with one or more IVR systems. As an example, but without being limitative, the application 240 may be associated with a bank and/or an insurance company. The application 240 may be configured to connect to IVR systems of the one or more service providers. In other examples, but still without being limitative, the application 240 may be a public cloud app such as Rainbow™ from ALE International or Slack™ from Slack technologies. In the embodiment illustrated at FIG. 2, the application 240 may be connected to the IVR system 204 through a cloud communication platform (not shown). In such embodiments, the application 240 is in direct data communication with the IVR system 204, for example, via a data channel 214. In the illustrated embodiments, the IVR system 204 is associated with the AA system 206 which comprises an application programming interface (API) 208. In this embodiment, the application 204 may directly interact with the IVR system 204 and/or the AA system 206 via the API 208. In some embodiments, the application 240 is configured so as to allow the user 210 to initiate phone calls directly from the application 240 without having to go through the native telephonic application 220.

The IVR system 204 may be a conventional IVR system which may be accessed via, for example, but without being limitative, a PLMN network and/or a PSTN network. Generally speaking, the purpose of the IVR system 204 is to allow one or more users to interact with a computer (i.e., the IVR system) through the use of voice and/or DTMF codes (also referred to as DTMF tones) input via a keypad. In some embodiments, an electronic device connects to the IVR system 204 by sending an audio call request (e.g., by initiating a phone call over a PLMN network and/or a PSTN network). Once an electronic device (e.g., the electronic device 202) has connected to the IVR system 204, via an audio channel (e.g., the audio channel 212), the IVR system 204 may respond with pre-recorded and/or dynamically generated audio messages to further direct users on how to proceed. The IVR system 204 is configured so as to present a menu of options and prompt the user to enter a selection (e.g., via a keypad associated with the electronic device). The menu of options may comprise a tree structure meaning that once the user has input a first selection, the user may be directed toward a selected node of the menu. The IVR system 204 may then present a sub-menu of options available for the selected node of the menu. As the person skilled in the art of the present technology may appreciate, the structure of the tree, including the number of nodes, the number of leafs and/or the number of levels may vary and is therefore not limitative. In some embodiments, the structure of the menu may be referred to as a menu navigation structure. The menu navigation structure may be embodied by tree data that contains the relevant information to partially or completely define the structure of the tree and therefore the structure of the menu. In some embodiments, the tree data may be relied upon to generate a visual representation of the menu, for example via one or more graphical user interface (GUI) components. In some embodiments, a position of the user in the structure of the tree (i.e., the structure of the menu) may be associated with the tree data so that it becomes possible to identify at which node and/or leaf of the tree the user is at a given time. For example, the IVR system 204 may be able to determine a position of a user in the menu navigation structure at any given time. Also, once the position of the user has been modified, for example, after the user 210 has input a new selection to get to a sub-menu and/or to the information she/he is looking for, the IVR system 204 may generate an updated position of the user with respect to the IVR tree data (i.e., the data modeling the structure of the menu).

Even though reference is made to a menu of options, it should be understood that the term "options" encompass multiple choices that the user may undertake to make. For example, an option may be to access information, a sub-menu and/or reach a particular responder. The term "option" should therefore not be deemed as being limitative. Similarly, the term "selection" encompass a given choice made by the user from multiple choices available to her/him. The term "selection" should therefore not be deemed as being limitative.

As it may be appreciated by the person skilled in the art of the present technology, the IVR system 204 may be used for mobile purchases, banking services, retail orders, travel information, weather conditions and so on. Implementation details of the regular functions of the IVR system 204 will become apparent to the person skilled in the art of the present technology and will therefore not be further discussed.

In some embodiments, the IVR system 204 comprises and automatic attendant system such as the AA system 206. In other embodiments, the IVR system 204 may not comprise an AA system per se but rather may be associated with an AA system, for example by being connected to an AA system. The AA system 206 may be exclusively associated with a given IVR system 204 but not necessarily. Multiple variations may therefore be envisioned. In some embodiments, the IVR system 204 and the AA system 206 each manages distinct functions. For example, but without being limitative, the IVR system 204 receives the incoming audio call requests, process the audio call requests and/or return a result based on a selection received from users whereas the AA system 206 routes audio calls (i.e., routes audio channel so as to connect electronic devices and terminals/attendants).

As illustrated in FIG. 2, the IVR system 204 and the AA system 206 are connected via channels A and B which may be dedicated channels. Other embodiments may also be envisioned and will become apparent to the person skilled in the art of the present technology. As for the IVR system 204, implementation details of the regular functions will become apparent to the person skilled in the art of the present technology and will therefore not be further discussed.

The AA system 206 also comprises an application programming interface (API) 208. In some embodiments, the API 208 specifies the interface between the electronic device 202 and the AA system 206 thereby allowing the application 240 and/or a web browser running on the electronic device 202 to access the AA system 206 and/or the IVR system 204 via the data channel 214. In some other embodiments, the API 208 may also be hosted by the IVR system 204.

In the embodiment illustrated at FIG. 2, the IVR system 204 is also connected to the telecommunication product (PBX) 260. The PBX 260 may be implemented in various ways, such as, for example, but without being limitative, network equipment allowing routing of channels from the IVR system 204 and/or the AA system 206 to terminals 262, 264 and 266. In some embodiments, each one of the terminals 262, 264 and 266 may be associated with a distinct responder.

Now that the various components of the networked computing environment 200 of FIG. 2 have been described, we shall not proceed to the description of an exemplary use case of the networked computing environment 200.

A user call may be initiated by the user 210 either from the native telephonic application 220 or the application 240. The application 220 detects that an audio phone call request has been initiated and/or that the audio channel 212 has been established with the IVR system 204 and/or that the responder of the call is the IVR system 204. In this scenario, the application 220 is connected to the API 208 via the data channel 214. Upon detecting that the audio phone call request has been initiated and/or that the audio channel 212 has been established with the IVR system 204 and/or that the responder of the call is the IVR system 204, the application 220 requests, from the API 208, IVR tree data representative of a menu navigation structure associated with the IVR system 204 (i.e., data allowing the application 220 to partially or completely generate a representation of the menu of options that the IVR system 204 provides to the user 210 via the audio channel 212). In some embodiments, the IVR tree data also allows to determine a position of the user with respect to the menu navigation structure (e.g., to determine if the user 210 is at a root of the menu, in a sub-menu . . . ). In some embodiments, the IVR tree data transmitted via the data channel 214 may be formatted in accordance with a defined format and/or protocol (e.g., html, xml, json . . . ). In some embodiments, the IVR tree data is text data which may be augmented with GUI components accessible from a memory of the electronic device 202 and/or via the API 208. The application 240 may, based on the IVR tree data, generate a GUI component representing the menu navigation structure or a portion of the menu navigation structure (e.g., a sub-menu wherein the user 210 is located at a given time). As a result, the user 210 may directly select, by interacting with the GUI component, an option (a sub-menu, an information the user is looking for, an attendant is trying to reach . . . ) without having to navigate through the whole tree representing the menu (i.e., without having to go through all the nodes that link the root of the menu to a given leaf). As a result, the user 210 may bypass the process of having to provide a selection for each one of the nodes that are located between the root of the menu and the leaf associated with the option the user 210 wishes to select. In some embodiments, the user 210 may also navigate back to another node and/or leaf without having to hang up and reconnect to the IVR system 204. In some embodiments, the user 210 may also submit information to the IVR system 204 from an interface associated with the application 240. For example, but without being limitative, the user 210 may have the IVR system 204 complete an action (e.g., setting up an appointment, buying a product . . . ).

The selection relating to the IVR tree data may be made, for example, but without being limitative, through a click, a touch event on a touch screen of the electronic device 202. The selection may be made on a keypad in which case a DTMF code/tone is generated and transmitted via the audio channel 212 to the IVR system 204. The selection may also be made by the user 210 pronouncing a word or a sound (e.g., "option 1", "call Jean-Claude Dus" . . . ) which is then transmitted via the audio channel 212 to the IVR system 204 which, in turn, relies on a speech-to-text algorithm to process the selection. The IVR system 204 may communicate with the AA system 206 via the channel B so that the AA system 206 may initiate an update which is then transmitted via the API 208 and the data channel 214 to the electronic device 202.

The selection may also be made by the user 210 interacting with the application 210 (e.g., a clickable visual representation of the menu navigation or a portion thereof) in which case the selection is transmitted via the data channel 214 to the IVR system 204. The IVR system 204 then processes the selection and update a position of the user 210 with respect to the menu navigation structure. In some embodiments, the AA system 208 receives the selection via the API 208 and then update the IVR system 204 through the channel A. In some embodiments, the AA system 208 may also cause the call established between the electronic device 202 and the IVR system 204 to be routed to one of the terminals 262, 264 or 266 via the PBX 260. In some embodiments, if the selection has been received via the audio channel 212 then the updated position is transmitted to the application 240 via the data channel 214. Conversely, if the selection has been received via the data channel 214 then the updated position is transmitted via the audio channel 212, for example, via an audio message. As a result, both the application 240 and the audio channel 212 are up-to-date and the user 210 can keep interacting with the IVR system 204 via either the audio channel 212 or the data channel 214. The communication channel between the user 210 and the IVR system 204 may therefore be deemed as being an augmented communication channel as the user 210 may interact with the IVR system 204 via either an audio channel or a data channel while maintaining both the audio channel and the data channel up-to-date. The user 210 may therefore starts interacting with the IVR system 204 via the audio channel then switch to interacting with the IVR system 204 via the data channel and then back to the audio channel. Multiple use cases may therefore be envisioned and will become apparent to the person skilled in the art of the present technology.

Figure 3:
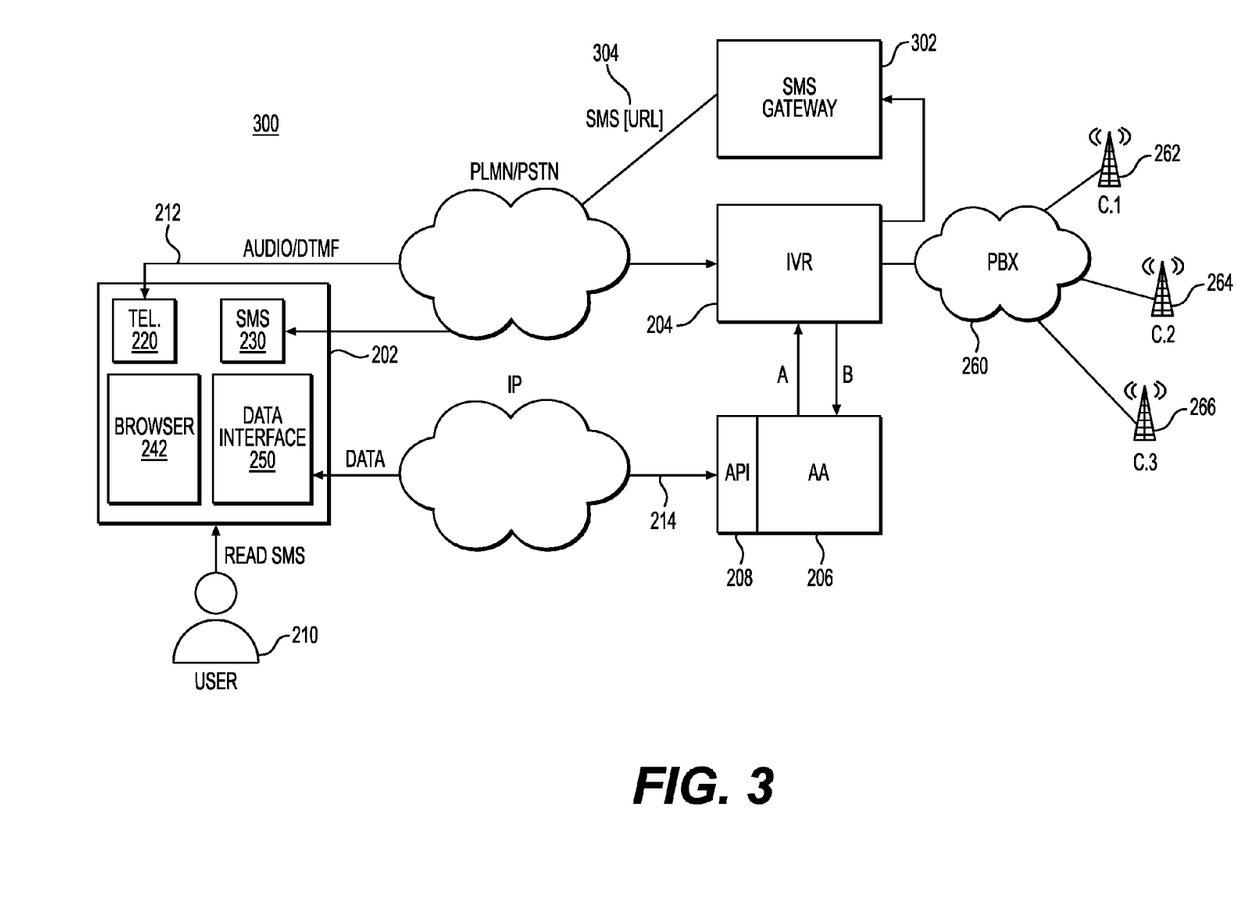
FIG. 3 is a diagram of a second networked computing environment suitable for use with some implementations of the present technology.

Turning now to FIG. 3, an alternative embodiment to the networked computing environment 200 is shown. The alternative embodiment is referred to as a networked computing environment 300 which is also suitable for use with some implementations of the present technology. As for the networked computing environment 200, the networked computing environment 300 comprises an electronic device 202 associated with a user 210, an interactive voice response (IVR) system 204, an automatic attendant (AA) system 206 and a telecommunication product (PBX) 260 connected to terminals 262, 264 and 266. The networked computing environment 300 differs from the networked computing environment 200 in that it also comprises a short messaging service (SMS) gateway 302.

As it may be appreciated the SMS gateway 302 is reachable (e.g., via a network) by the IVR system 204. The SMS gateway 302 may also communicate with the electronic device 202 for example, but without being limitative, by sending SMS messages (e.g., a SMS message 304) to the electronic device 202. The SMS messages received by the electronic device 202 may be presented to the user 210 via the SMS application 230. Implementation details of the regular functions of the SMS gateway 302 will become apparent to the person skilled in the art of the present technology and will therefore not be further discussed.

As it may be appreciated, a browser 242 running on the electronic device 202 is also illustrated to exemplify embodiments of the present technology. It should be understood that the browser 242 can be operated in replacement of or in addition to the application 240 illustrated in FIG. 2. The browser 242 may be a conventional web browser or a dedicated web browser. Implementation details of the regular functions of the browser 242 will become apparent to the person skilled in the art of the present technology and will therefore not be further discussed.

Figure 4:
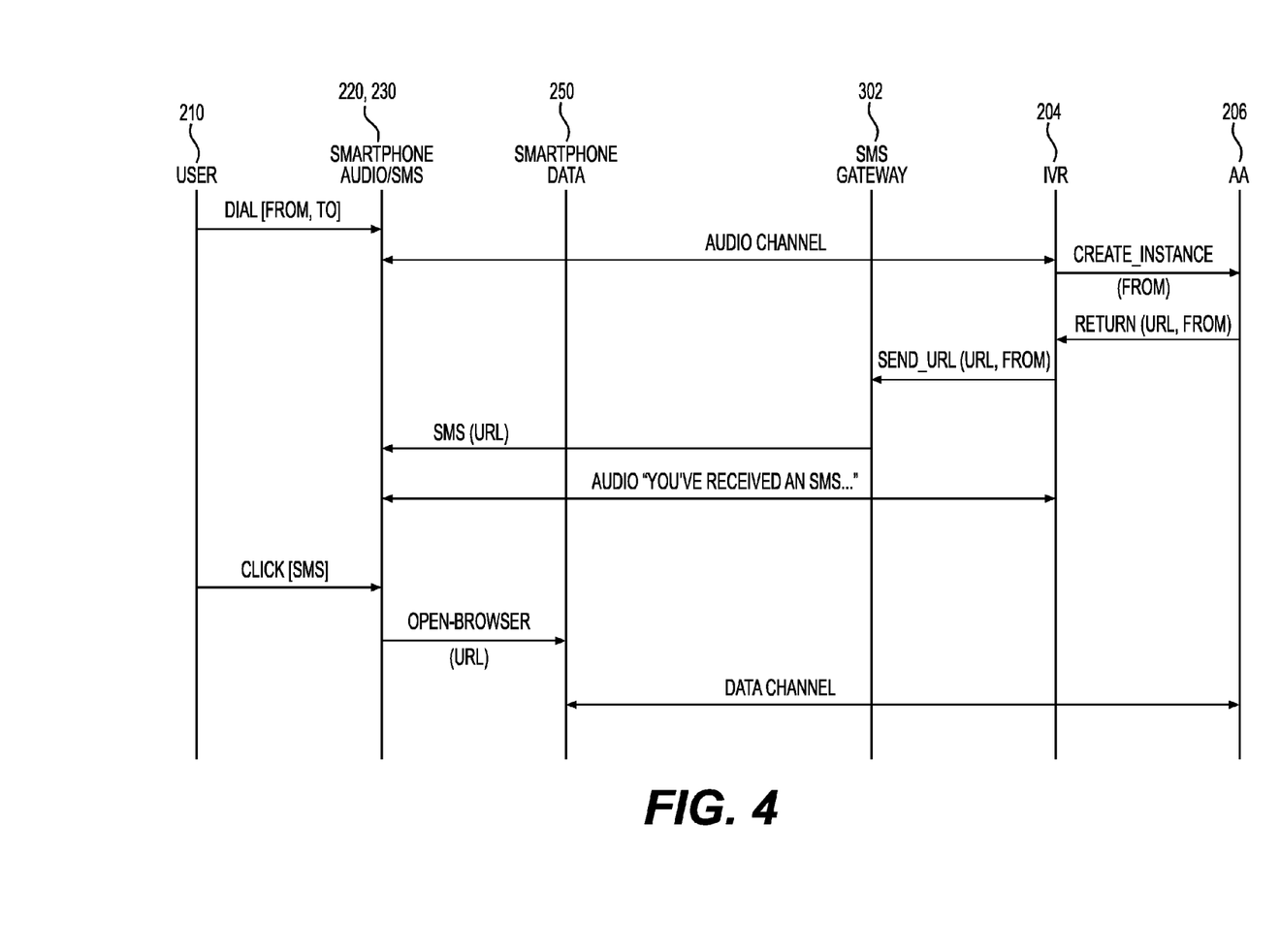
FIG. 4 is a first diagram of steps establishing an augmented communication channel in accordance with an embodiment of the present technology.

A usage scenario of the networked computing environment 300 will now be presented in connection with FIG. 4. As it may be appreciated, no data channel may be pre-established between the electronic device 202 and the IVR system 204 as the application 240 (which is pre-configured to connect to the API 208) may not be running on the electronic device 202 (e.g., the application 240 has not been installed on the electronic device 202, the IVR system 204 is not associated with a dedicated application, the application 240 is not accessible . . . ). As a result, such embodiments require a data channel to be established between the IVR system 204 and the electronic device 202. It should be understood that establishing a connection between the IVR system 204 and the electronic device 202 should be understood as encompassing establishing a data connection between the IVR system 204 and the electronic device 202 via the AA system 206.

In the illustrated embodiment, the user 210 initiates a call to the IVR system 204 (e.g., by sending an audio call request) and the audio channel 212 between the electronic device 230 and the IVR system 204 is established. When the call becomes active (i.e., the audio channel 212 is established), the IVR system 204 determines an originator identifier identifying the user 210. As an example, but without being limitative, the originator identifier may be a phone number associated with the electronic device 202. In some embodiments, the IVR system 204 determines the originator identifier by relying on Calling Line Identification (CLI) services. Other mechanisms may be relied upon to complete the determination may also be envisioned. In some embodiments, the IVR system 204 requests to the AA system 206, via the channel A, to generate a uniform resource locator (URL) associated with the originator identifier. In some embodiments, the URL may be a one-time URL. As an example, but without being limitative, the URL may follow the following format (https://aa_tree.ale-international.com/phone_id&date). The URL is then transmitted by the AA system 206 to the IVR system 204 which, in turn, sends it to the SMS gateway 302. The SMS gateway then generates a SMS message comprising the URL. The SMS message is then sent by the SMS gateway 302 to the electronic device 202. In some embodiments, the IVR system 204 may also generate an audio communication via the audio channel 212 to warm the user 210 that an SMS message has been sent. The user 210 may then open the SMS message, for example, via the SMS application 230 and click on the URL contained in the SMS message. Upon clicking on the URL, the browser 242 then relies on the data interface 250 to establish the data channel 214 between the electronic device 202 and the IVR system 204. The IVR system 204 may then proceed to the sending of IVR tree data so that a menu structure (or a portion thereof) which may be presented to the user 210 via the browser 242. The user 210 may then interact with the IVR system 204 and/or the AA system 206 in a similar fashion than previously described in connection with the embodiment shown in FIG. 2. As an example, but without being limitative, the browser 242 may interact with the IVR system 204 by sending an receiving HTTP requests comprising IVR tree data.

As described in the above-paragraph, the present technology may rely on the SMS technology (or an equivalent thereof) to escalade from an audio channel to a data channel thereby establishing an augmented communication channel between the IVR system 204 and the electronic device 202. Even though the example of the networked computing environment 300 relies on SMS technology, it should be understood that this aspect is not limitative and that other technologies may equally be relied upon without departing from the scope of the present technology. As an example, but without being limitative, mobile push service technology (such as the push technology from Apple Inc.) may equally be used.

Figure 5:
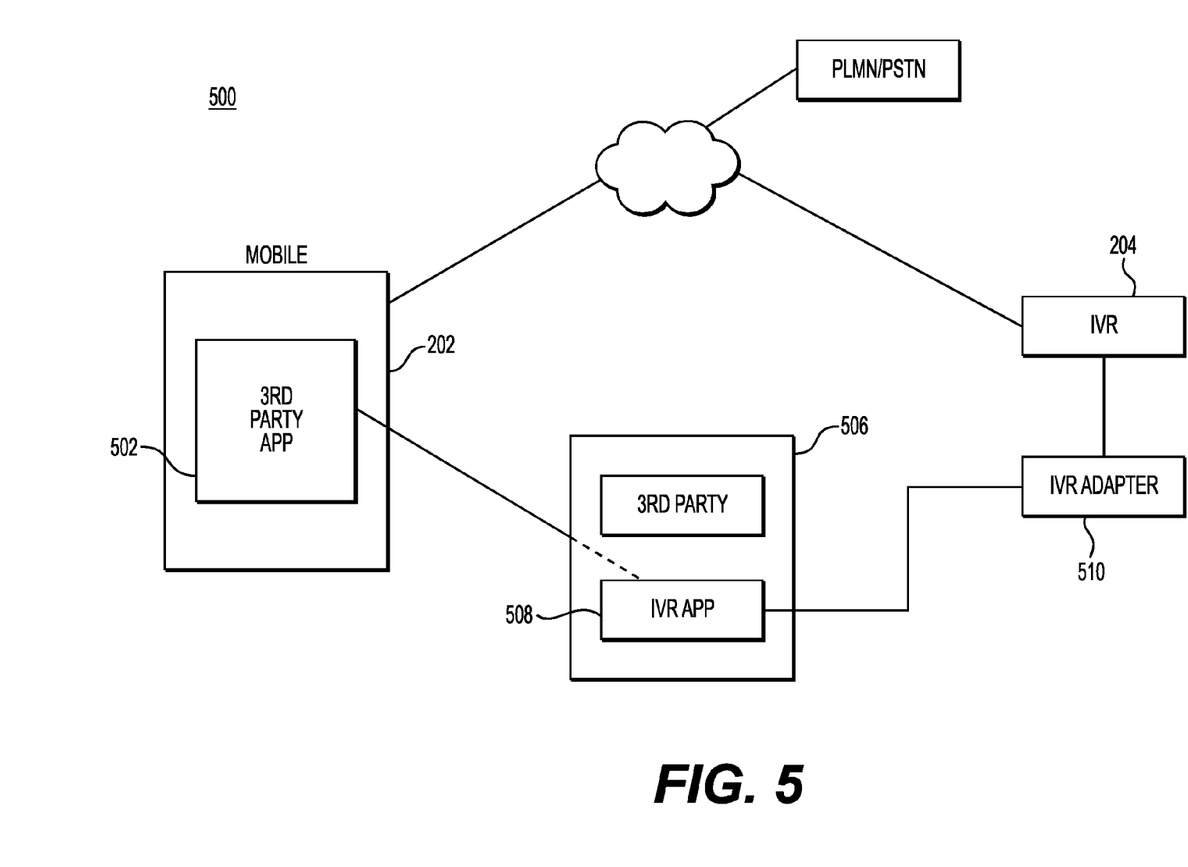
FIG. 5 is a diagram of an alternative networked computing environment suitable for use with some implementations of the present technology.

Turning now to FIG. 5, an example of an alternative embodiment 500 relied upon to escalade from an audio channel to a data channel is depicted. In the illustrated embodiment, the present technology relies on existing data connection maintained by a third party 506. In some embodiments, such third party 506 may be a social network such as, but not limited to, Facebook from Facebook Inc. In some embodiments, the third party 506 may operate an IVR application 508 (e.g., a gateway) which may interact with the IVR system 204 via an IVR adapter 510 associated with the IVR system 204. The IVR application 508 may allow data (such as an URL generated based on an originator identifier) to be transmitted from the IVR system 204 to a third party application 502 (e.g., a Facebook app) running on the electronic device 202. In some embodiments, the third party application 502 may support text-based communications.

In some embodiments, the originator identifier may be relied upon by the IVR system 204 to send a request to the third party 506 and identify a user of the third party service based on the originator identifier (e.g., identify the user associated with the electronic device 202). The third party 506 may then relies on its own API to establish a data channel with the third party application 502 running on the electronic device 202. The data channel may support text, widget and/or graphic elements to represent IVR tree data. In some alternative embodiments, the third party 506 may also offer access to its services via a regular browser (such as the browser 242). In such embodiments, the data channel may be established between the third party 506 and the browser running on the electronic device 202. In such embodiment, an URL generated based on an originator identifier may be transmitted by the third party 506 to the electronic device 202. A data channel may then be established in a similar way as previously described in connection with the description of FIG. 3.

Figure 6:
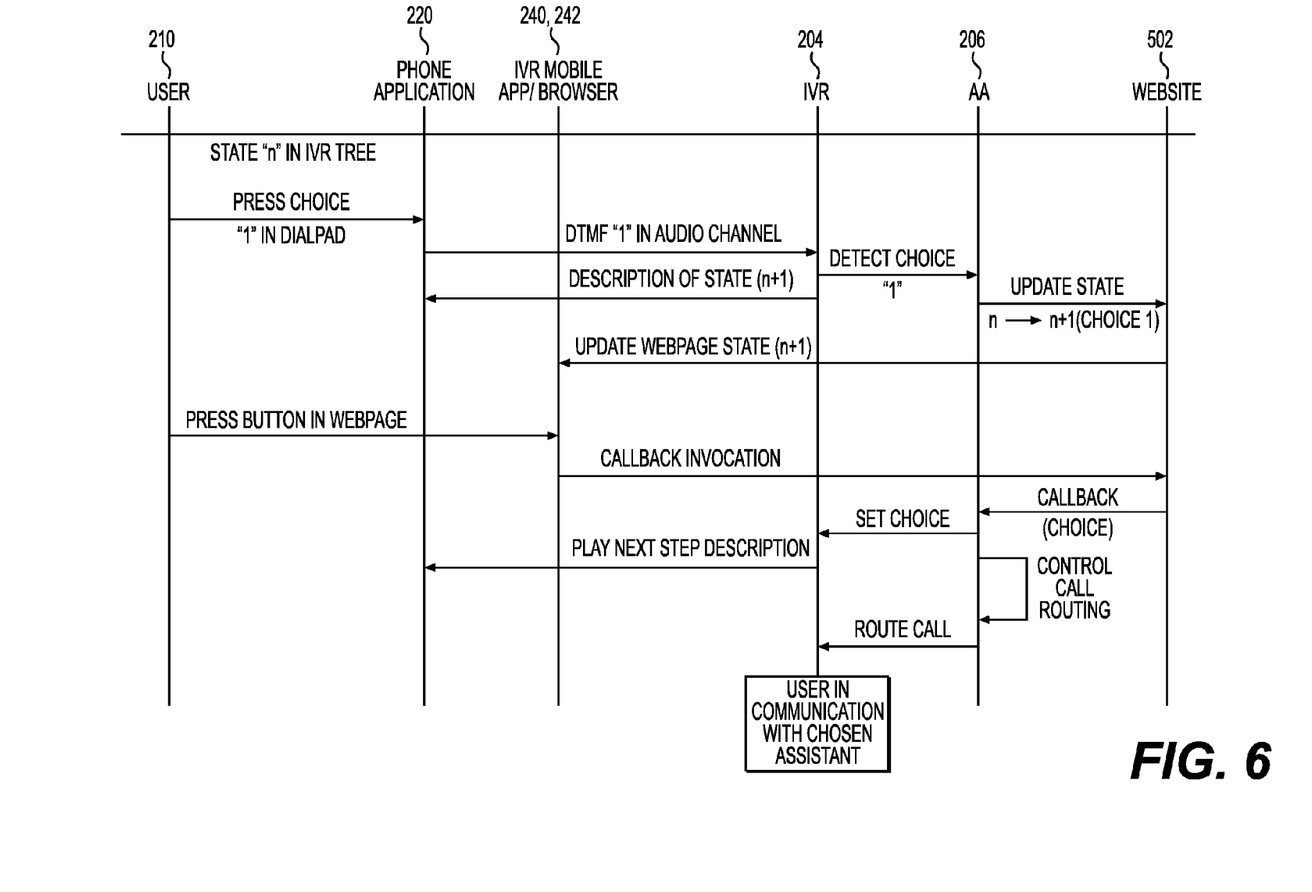
FIG. 6 is a second diagram of steps establishing an augmented communication channel in accordance with another embodiment of the present technology.

Turning now to FIG. 6, an example of how an IVR tree may be synchronized is provided. The example starts with an assumption that the user 210 is positioned with respect to the menu navigation structure at a position "n" (which may also be referred to as a state "n"). The user 210 presses "1" on the keypad associated with the electronic device 202. In response, the native telephonic application 220 generates a DMTF code/tone corresponding to "1" which is sent via the audio channel 212 to the IVR system 204. The DMTF code/tone is decoded by the IVR system 204 which then indicates to the AA system 206 that the user 210 has selected "1". The AA system 206 generates an updated position of the user 210 with respect to the menu navigation structure (e.g., evolves the menu navigation structure at a position "n+1").

A webpage representing the menu navigation structure and hosted at a website 502 is then updated accordingly. In some embodiments, this update (also referred to as an "updated position") may result in a new arrangement of buttons and information displayed at the browser 242. The updated position may be sent to the browser 242 by sending HTTP chunks embedded in the webpage and/or information pushed to the browser 242 using a web socket protocol. Other variations may also be envisioned and will become apparent to the person skilled in the art of the present technology.

The next step shown in FIG. 6 illustrates an alternative interaction between the user 210 and the IVR system 204. The user 210 generates a user selection relating to the menu navigation structure by interacting with the webpage presented in the application 240 which, in turn, triggers an audio message played to the user 210 via the audio channel 212. In the illustrated example of FIG. 6, the selection ends by causing the PBX 260 to route the audio call from the IVR system 204 to an attendant (e.g., a chosen assistant) associated with one of the terminals 262, 264 and 266.

Figure 7:
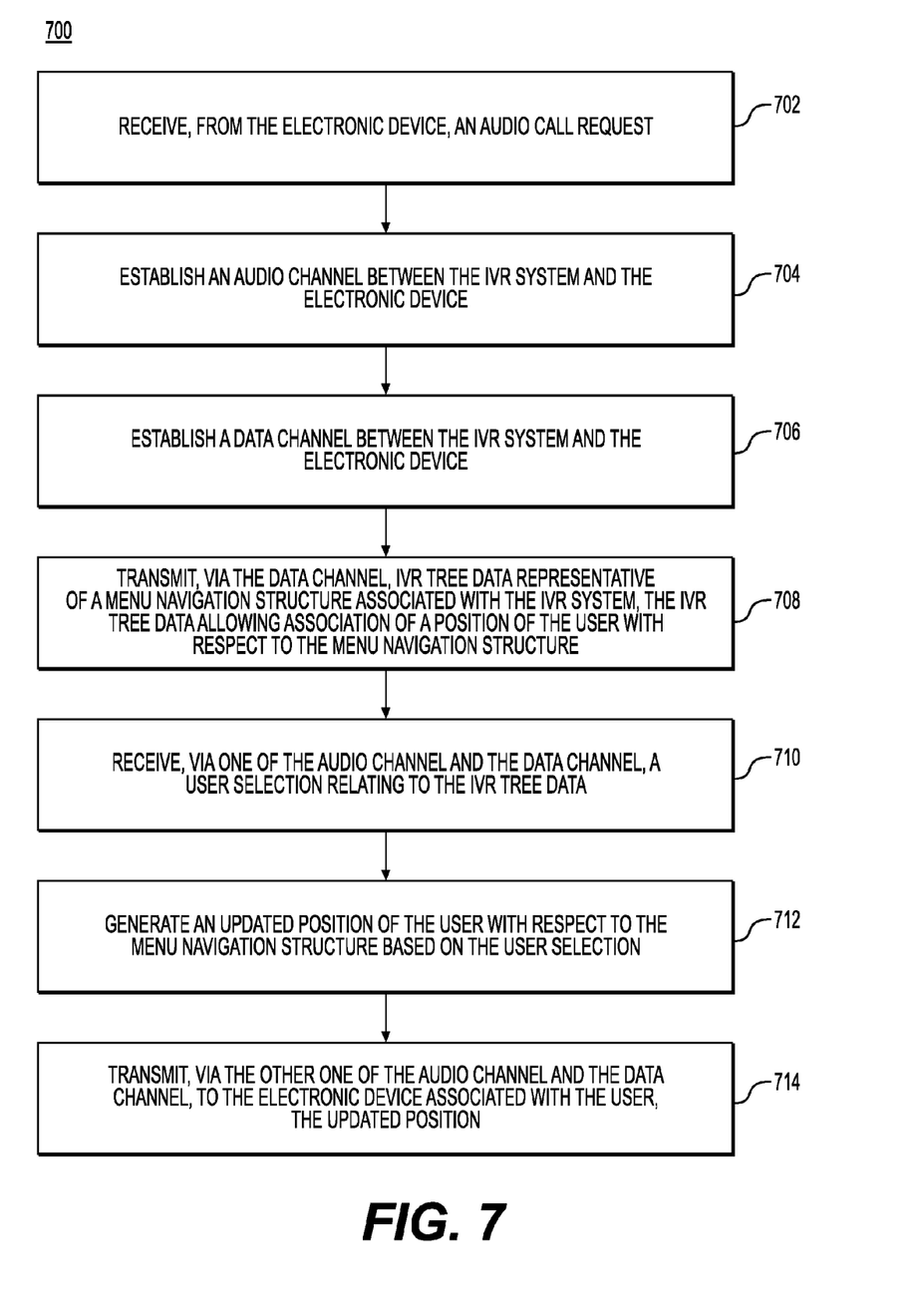
FIG. 7 is a diagram illustrating a flowchart illustrating a first computer-implemented method implementing embodiments of the present technology.

Turning now to FIG. 7, a flowchart illustrating a computer-implemented method 700 of establishing an augmented communication channel between an interactive voice response (IVR) system and an electronic device associated with a user is illustrated. In some embodiments, the computer-implemented method 700 may be (completely or partially) implemented on a computing environment similar to the computing environment 100, 200, 300. In some embodiments, the method 700 may be (completely or partially) implemented on an IVR system comprising an AA system such as, but not limited to the IVR system 204 and the AA system 206.

The method 700 starts at step 702 by receiving, from the electronic device, an audio call request. The method 700 then proceeds with step 704 by establishing an audio channel between the IVR system and the electronic device. At a step 706, the method 700 establishes a data channel between the IVR system and the electronic device. At a step 708, the method 700 transmits, via the data channel, IVR tree data representative of a menu navigation structure associated with the IVR system, the IVR tree data allowing association of a position of the user with respect to the menu navigation structure. At a step 710, the method 700 proceeds to receiving, via one of the audio channel and the data channel, a user selection relating to the IVR tree data. At a step 712, the method 700 proceeds to generating an updated position of the user with respect to the menu navigation structure based on the user selection. At a step 714, the method 700 proceeds to transmitting, via the other one of the audio channel and the data channel, to the electronic device associated with the user, the updated position.

In some embodiments, the IVR system is associated with an automatic attendant (AA) system. In some embodiments, the user selection relating to the IVR tree data comprises at least one of a dual-tone multi-frequency (DTMF) tone and a selection from a graphical user interface (GUI) displayed on the electronic device.

In some embodiments, the method 700 further comprises routing the audio channel so as to connect the electronic device to a selected terminal.

In some embodiments, prior to establishing a data channel between the IVR system and the electronic device, the method 700 comprises receiving, by an application programming interface (API) associated with the AA system, a request to provide the IVR tree data representative of the navigation structure associated with the IVR system.

In some embodiments, the IVR system is associated with a short message service (SMS) gateway.

In some embodiments, the method 700, after receiving the audio call request, further comprises:
- determining an originator identifier identifying the user;
- generating a uniform resource locator (URL) based on the originator identifier; and
- sending, via the SMS gateway, to the electronic device, a SMS message comprising the URL.

In some embodiments, the method 700 further comprises transmitting, via the audio channel, to the electronic device, an indication that the SMS message has been sent.

In some embodiments, the method 700, after receiving the audio call request, further comprises determining an originator identifier identifying the user; and wherein establishing the data channel between the IVR system and the electronic device is based on the originator identifier.

Figure 8:
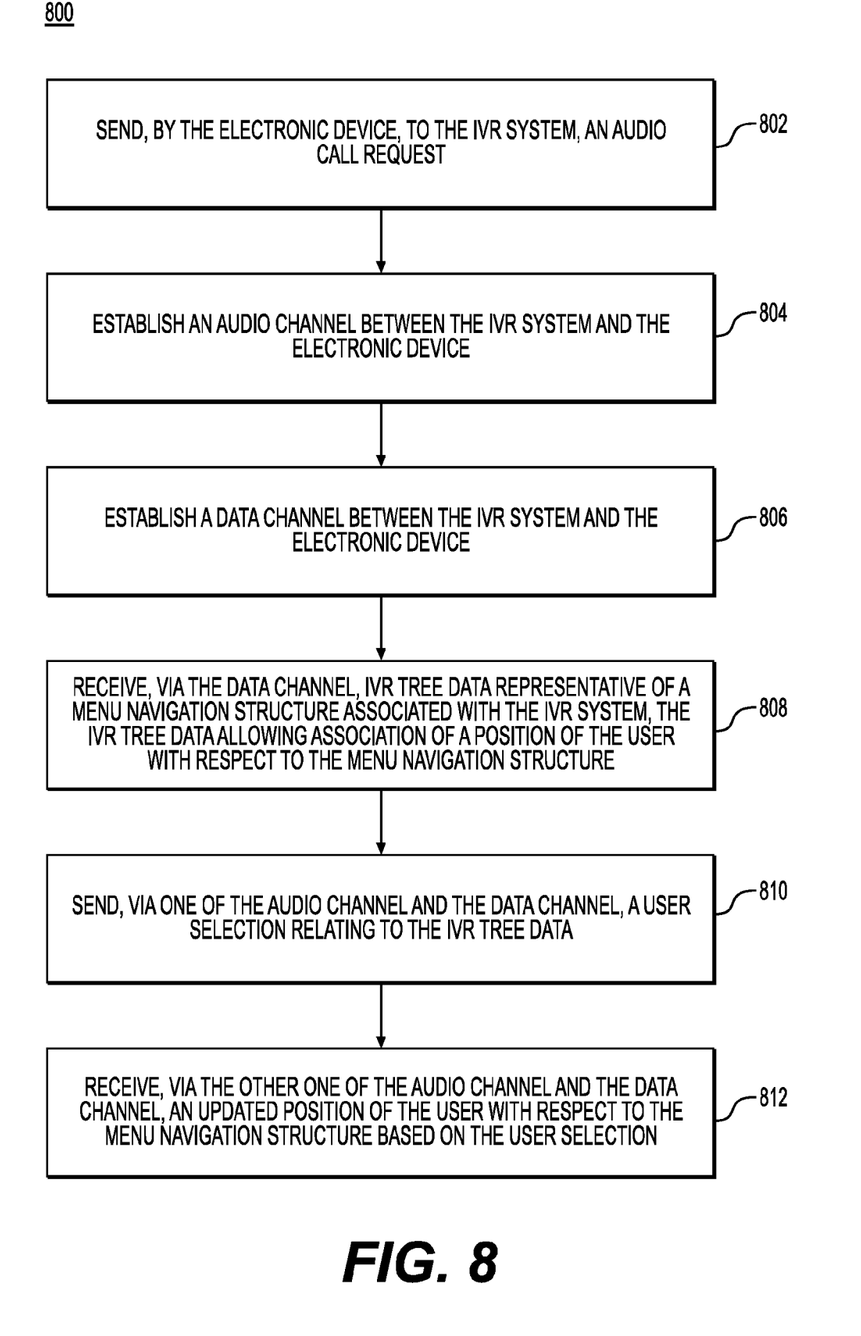
FIG. 8 is a diagram illustrating a flowchart illustrating a second computer-implemented method implementing embodiments of the present technology.

Turning now to FIG. 8, a flowchart illustrating a computer-implemented method 800 of establishing an augmented communication channel between an interactive voice response (IVR) system and an electronic device associated with a user is illustrated. In some embodiments, the computer-implemented method 800 may be (completely or partially) implemented on a computing environment similar to the computing environment 100, 200, 300. In some embodiments, the method 800 may be (completely or partially) implemented on an electronic device associated with a user such as, but not limited to the electronic device 202.

The method 800 starts at a step 802 by sending, by the electronic device, to the IVR system, an audio call request. Then, at a step 804, the method 800 executes establishing an audio channel between the IVR system and the electronic device. At a step 806, the method 800 proceeds to establishing a data channel between the IVR system and the electronic device. The method 800 proceeds to a step 808 by receiving, via the data channel, IVR tree data representative of a menu navigation structure associated with the IVR system, the IVR tree data allowing association of a position of the user with respect to the menu navigation structure. At a step 810, the method 800 proceeds to sending, via one of the audio channel and the data channel, a user selection relating to the IVR tree data. At a step 812, the method 800 proceeds to receiving, via the other one of the audio channel and the data channel, an updated position of the user with respect to the menu navigation structure based on the user selection.

In some embodiments, the IVR system is associated with an automatic attendant (AA) system.

In some embodiments, prior to establishing a data channel between the IVR system and the electronic device, the method 800 comprises sending, to an application programming interface (API) associated with the AA system, a request to provide IVR tree data representative of the navigation structure associated with the IVR system.

In some embodiments, the electronic device executes an IVR application configured to connect to the API and wherein the application comprises instructions to:
- detect that the audio call request has been sent; and
- upon detecting that the audio call request has been sent, trigger the sending, via the data channel, to the API associated with the AA system, of the request to provide the IVR tree data.

In some embodiments, detecting that the audio call request has been sent comprises detecting that the audio call request has been initiated from one of the application and a native telephonic application running on the electronic device.

In some embodiments, the user selection relating to the IVR tree data comprises at least one of a dual-tone multi-frequency (DTMF) tone and a selection from a graphical user interface (GUI) displayed on the electronic device.

In some embodiments, the method 800 further comprises receiving, by the electronic device, an SMS message comprising a uniform resource locator (URL) based on an originator identifier identifying the user.

In some embodiments, upon clicking on the URL, the electronic device connects to the API via the data channel.

While the above-described implementations have been described and shown with reference to particular steps performed in a particular order, it will be understood that these steps may be combined, sub-divided, or re-ordered without departing from the teachings of the present technology. At least some of the steps may be executed in parallel or in series. Accordingly, the order and grouping of the steps is not a limitation of the present technology.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A computer-implemented method of establishing an augmented communication channel between an interactive voice response (IVR) system and an electronic device associated with a user, the IVR system being associated with a short message service (SMS) gateway, the method comprising:
- receiving, from the electronic device, an audio call request;
- after receiving the audio call request:
  - determining an originator identifier identifying the user;
  - generating a uniform resource locator (URL) based on the originator identifier;
  - sending, via the SMS gateway, to the electronic device, a SMS message comprising the URL;
- establishing an audio channel between the IVR system and the electronic device;
- establishing a data channel between the IVR system and the electronic device;
- transmitting, via the data channel, IVR tree data representative of a menu navigation structure associated with the IVR system, the IVR tree data allowing association of a position of the user with respect to the menu navigation structure;
- receiving, via one of the audio channel and the data channel, a user selection relating to the IVR tree data;
- generating an updated position of the user with respect to the menu navigation structure based on the user selection; and
- transmitting, via the other one of the audio channel and the data channel, to the electronic device associated with the user, the updated position.

2. The method of claim 1, wherein the IVR system is associated with an automatic attendant (AA) system.

3. The method of claim 2, wherein prior to establishing a data channel between the IVR system and the electronic device, the method comprises receiving, by an application programming interface (API) associated with the AA system, a request to provide the IVR tree data representative of the navigation structure associated with the IVR system.

4. The method of claim 1, wherein the user selection relating to the IVR tree data comprises at least one of a dual-tone multi-frequency (DTMF) tone and a selection from a graphical user interface (GUI) displayed on the electronic device.

5. The method of claim 1, further comprising:
routing the audio channel so as to connect the electronic device to a selected terminal.

6. The method of claim 1, further comprising:
transmitting, via the audio channel, to the electronic device, an indication that the SMS message has been sent.

7. The method of claim 1, wherein the method, after receiving the audio call request, further comprises determining an originator identifier identifying the user; and wherein establishing the data channel between the IVR system and the electronic device is based on the originator identifier.

8. A computer-implemented method of establishing an augmented communication channel between an interactive voice response (IVR) system and an electronic device associated with a user, the IVR system being associated with an automatic attendant (AA) system, the method comprising:
sending, by the electronic device, to the IVR system, an audio call request;
prior to establishing a data channel between the IVR system and the electronic device, sending to an application programming interface (API) associated with the AA system, a request to provide IVR tree data representative of the navigation structure associated with the IVR system;
receiving, by the electronic device, an SMS message comprising a uniform resource locator (URL) based on an originator identifier identifying the user;
establishing an audio channel between the IVR system and the electronic device;
establishing the data channel between the IVR system and the electronic device;
upon clicking on the URL, connecting the electronic device to the API via the data channel;
receiving, via the data channel, IVR tree data representative of a menu navigation structure associated with the IVR system, the IVR tree data allowing association of a position of the user with respect to the menu navigation structure;
sending, via one of the audio channel and the data channel, a user selection relating to the IVR tree data; and
receiving, via the other one of the audio channel and the data channel, an updated position of the user with respect to the menu navigation structure based on the user selection.

9. The method of claim 8, wherein the electronic device executes an IVR application configured to connect to the API and wherein the application comprises instructions to:
detect that the audio call request has been sent; and
upon detecting that the audio call request has been sent, trigger the sending, via the data channel, to the API associated with the AA system, of the request to provide the IVR tree data.

10. The method of claim 9, wherein detecting that the audio call request has been sent comprises detecting that the audio call request has been initiated from one of the application and a native telephonic application running on the electronic device.

11. The method of claim 8, wherein the user selection relating to the IVR tree data comprises at least one of a dual-tone multi-frequency (DTMF) tone and a selection from a graphical user interface (GUI) displayed on the electronic device.

12. A system for establishing an augmented communication channel between an interactive voice response (IVR) system and an electronic device associated with a user, the IVR system being associated with a short message service (SMS) gateway, the system comprising:
a processor;
a non-transitory computer-readable medium, the non-transitory computer-readable medium comprising control logic which, upon execution by the processor, causes:
receiving, from the electronic device, an audio call request;
after receiving the audio call request:
determining an originator identifier identifying the user;
generating a uniform resource locator (URL) based on the originator identifier;
sending, via the SMS gateway, to the electronic device, a SMS message comprising the URL;
establishing an audio channel between the IVR system and the electronic device;
establishing a data channel between the IVR system and the electronic device;
transmitting, via the data channel, IVR tree data representative of a menu navigation structure associated with the IVR system, the IVR tree data allowing association of a position of the user with respect to the menu navigation structure;
receiving, via one of the audio channel and the data channel, a user selection relating to the IVR tree data;
generating an updated position of the user with respect to the menu navigation structure based on the user selection; and
transmitting, via the other one of the audio channel and the data channel, to the electronic device associated with the user, the updated position.

13. A system for establishing an augmented communication channel between an interactive voice response (IVR) system and an electronic device associated with a user, the IVR system being associated with an automatic attendant (AA) system, the system comprising:
a processor;
a non-transitory computer-readable medium, the non-transitory computer-readable medium comprising control logic which, upon execution by the processor, causes:
sending, by the electronic device, to the IVR system, an audio call request;
prior to establishing a data channel between the IVR system and the electronic device, sending to an application programming interface (API) associated with the AA system, a request to provide IVR tree data representative of the navigation structure associated with the IVR system;
receiving, by the electronic device, an SMS message comprising a uniform resource locator (URL) based on an originator identifier identifying the user;
establishing an audio channel between the IVR system and the electronic device;
establishing the data channel between the IVR system and the electronic device;

upon clicking on the URL, connecting the electronic device to the API via the data channel;

receiving, via the data channel, IVR tree data representative of a menu navigation structure associated with the IVR system, the IVR tree data allowing association of a position of the user with respect to the menu navigation structure;

sending, via one of the audio channel and the data channel, a user selection relating to the IVR tree data; and receiving, via the other one of the audio channel and the data channel, an updated position of the user with respect to the menu navigation structure based on the user selection.

* * * * *